United States Patent [19]
Watanabe et al.

[11] Patent Number: 5,743,156
[45] Date of Patent: Apr. 28, 1998

[54] VEHICLE POWER UNIT STRUCTURE

[75] Inventors: Kenzo Watanabe; Masayuki Ushiki; Yuichiro Yanagida; Hajime Kashiwase, all of Tokyo, Japan

[73] Assignee: Fuji Jukogyo Kabushiki Kaisha, Tokyo, Japan

[21] Appl. No.: 670,981

[22] Filed: Jun. 28, 1996

[30] Foreign Application Priority Data

Aug. 11, 1995 [JP] Japan ................................. 7-227087

[51] Int. Cl.⁶ .................................................. F16H 57/02
[52] U.S. Cl. .................................... 74/606 R; 180/305
[58] Field of Search ................................ 74/606 R, 487, 74/489; 180/305, 62, 307; 60/487, 464, 490, 494, 453, 454, 484, 485

[56] References Cited

U.S. PATENT DOCUMENTS

| | | | |
|---|---|---|---|
| 5,299,880 | 4/1994 | Bouchard | 74/606 R X |
| 5,511,448 | 4/1996 | Kameda et al. | 74/606 R X |
| 5,593,000 | 1/1997 | Johnson | 180/305 |
| 5,598,748 | 2/1997 | Okada et al. | 74/606 R |

FOREIGN PATENT DOCUMENTS

| | | | |
|---|---|---|---|
| 2-6222 | 1/1990 | Japan . | |
| 4-55128 | 2/1992 | Japan | 74/606 R |
| 4-136557 | 5/1992 | Japan | 74/606 R |
| 6-221408 | 8/1994 | Japan | 74/606 R |
| 2270661 | 3/1994 | United Kingdom | 74/606 R |

*Primary Examiner*—Vinh T. Luong
*Attorney, Agent, or Firm*—Beveridge, DeGrandi, Weilacher & Young, L.L.P.

[57] ABSTRACT

A power unit for a front drive vehicle having a horizontally opposed engine mounted longitudinally, a clutch, a transmission and a differential, in which a differential housing integrally formed with a transmission housing is disposed at a space adjacent to the frontally offset cylinder block of left or right cylinder blocks and a left and right axle shaft is extended from the differential housing respectively. Further, the differential housing is connected by a fastening bolt with a slide bush to a lower case of the engine so as to support the reaction force derived from the axle shafts. The power unit thus constituted offers a short length of a front overhang of the vehicle and the compactness of a power unit.

22 Claims, 2 Drawing Sheets

VEHICLE POWER UNIT STRUCTURE

BACKGROUND OF THE INVENTION

1. Field of the Invention

The present invention relates to a structure of a power unit for a front drive vehicle, more particularly to a structure of a power unit having a differential including a final reduction device disposed ahead of a mating surface of an engine and a transmission for the purpose of reducing a front overhang length of the vehicle.

2. Prior Art

In a front engine-front drive vehicle or a four-wheel drive vehicle having an engine whose output shaft is arranged in the longitudinal direction of the vehicle, generally, its front final reduction gearing mechanism (front differential) is disposed between the clutch mounted at the rear end of the engine and the transmission which is connected to the engine from behind the clutch.

In the arrangement of the engine and the transmission like this, the power unit is extended largely in the longitudinal direction of the vehicle and it is therefore difficult to achieve compactness of the power unit. Besides, it is also difficult to reduce the front overhang length of the vehicle because the longitudinal position of the front wheels is dependent on the position of the front differential.

Japanese Unexamined Patent Application Toku-Kai-Hei 2-6222 discloses a technique in which the engine has a cylinder axis set an inclination of 45 degrees angle in one of the left or right directions of the vehicle with respect to the vertical line and the transmission is connected with engine at the rear end thereof. In which, a front differential housing separated from the transmission case for accommodating a final reduction gear set therein is incorporated in the space on the inclined side of the cylinder block adjacent to a lower case or an oil pan of the engine.

This arrangement of the engine, the transmission and the differential housing offers the advantages of the compactness of the power unit with respect to the longitudinal direction of the vehicle and a short overhang length of the vehicle front portion extending ahead of the front wheels.

On the other hand, in this arrangement there is a disadvantage that it is difficult to realize the compactness of the power unit with respect to the lateral direction of the vehicle because a substantial distance in the horizontal direction is needed between the center of the crankshaft and that of the drive pinion of the final reduction device.

Another disadvantage of this arrangement is a problem of the strength. That is, in the construction of this arrangement, an intermediate drive shaft for driving a front wheel on the opposite side of the differential housing is supported by the lower case or the oil pan of the engine in such a way that it passes therethrough. Since the lower case or the oil pan is not directly jointed to the transmission and the bearing load of the intermediate shaft is concentrated on the bearings provided in the lower case or the oil pan, the overhang length in the longitudinal direction with respect to the transmission case can not be so much shortened. A large overhang length produces a greater amount of stress on the mounting portion of the differential housing due to the reaction force of the hypoid gear of the final reduction device, thereby the differential housing possibly being subjected to deformation. Furthermore, since the lower case or the oil pan is not directly jointed to the transmission and this produces a partial opening portion in the jointing surface of the front end of the transmission with the rear end of the engine, the bending rigidness of the overall power unit in the vertical direction is reduced.

SUMMARY OF THE INVENTION

The present invention has been accomplished to solve the aforementioned disadvantages and its primary object is to provide a power unit of a vehicle having a short front overhang length. A secondary object of the present invention is to provide a power unit of a vehicle having a compact size and an excellent assembling precision.

To achieve these objects, the power unit according to the present invention comprises:

a breaking portion provided on a flange surface of the front transmission housing for partially breaking the flange surface;

a differential disposed ahead of the clutch and under a cylinder block frontally offset of the left and right cylinder blocks for driving axle shafts;

a transmission output shaft extended ahead of the transmission for driving the differential;

a differential housing integrally formed with the front transmission housing and connected at the breaking portion with the front transmission housing for accommodating the transmission output shaft and the differential therein;

jointing means for jointing the differential housing to the lower case of the engine; and bearing means provided in the lower case of the engine for supporting one of said axle shafts extending to an opposite side of the engine.

DETAILED DESCRIPTION OF PREFERRED EMBODIMENTS

Figure 1A:
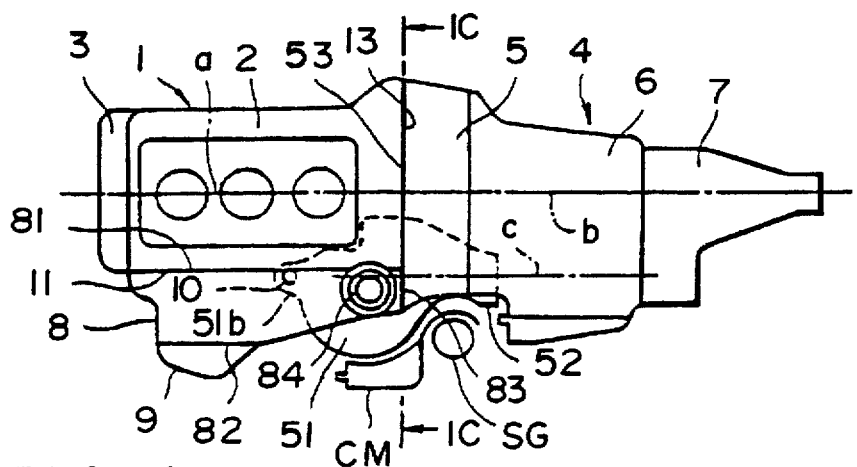
FIG. 1 is a left side view of a power unit according to an embodiment of the present invention.
FIG. 1b is a bottom view of a power unit according to an embodiment of the present invention.
FIG. 1c is a sectional view taken along a Line IC—IC shown in FIG. 1a, indicating a jointing surface of an engine to the front end of a transmission.
Figure 1B:
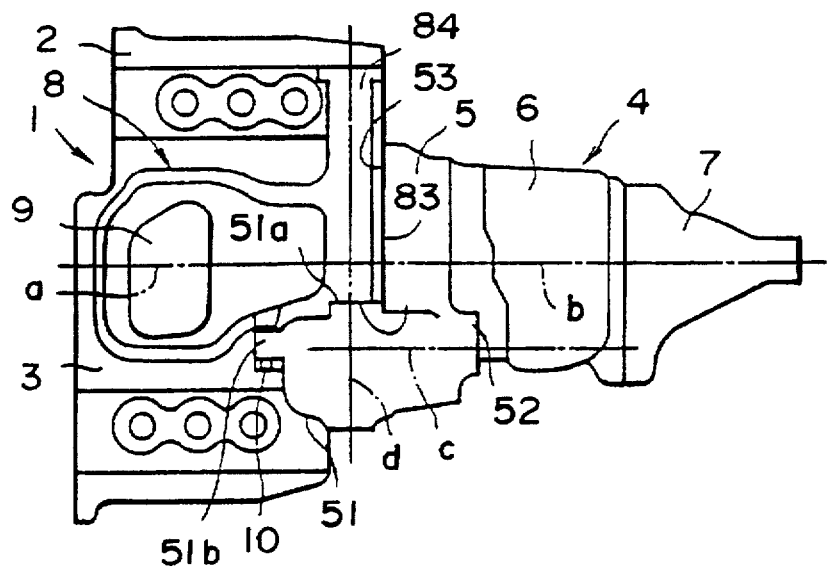
Figure 1C:
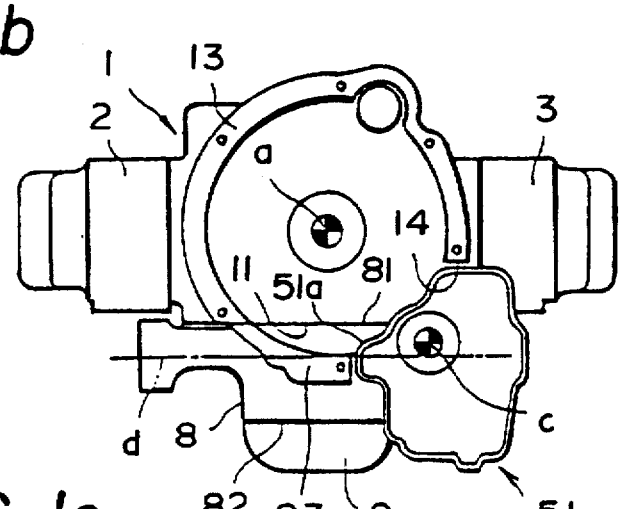

Referring now to Figs. 1a, 1b and 1c, numeral 1 denotes a horizontally opposed engine in which its left bank 2 is offset to its right bank 3 in the lengthwise direction of the engine with respect to the center of the engine 1 (center of the crankshaft). Therefore the rear ends of the left and right bank are also offset to each other in the lengthwise direction of the engine. As shown in FIG. 1b, according to an embodiment, the right bank 3 is offset to the left bank 2 in the frontal direction.

Figure 2A:
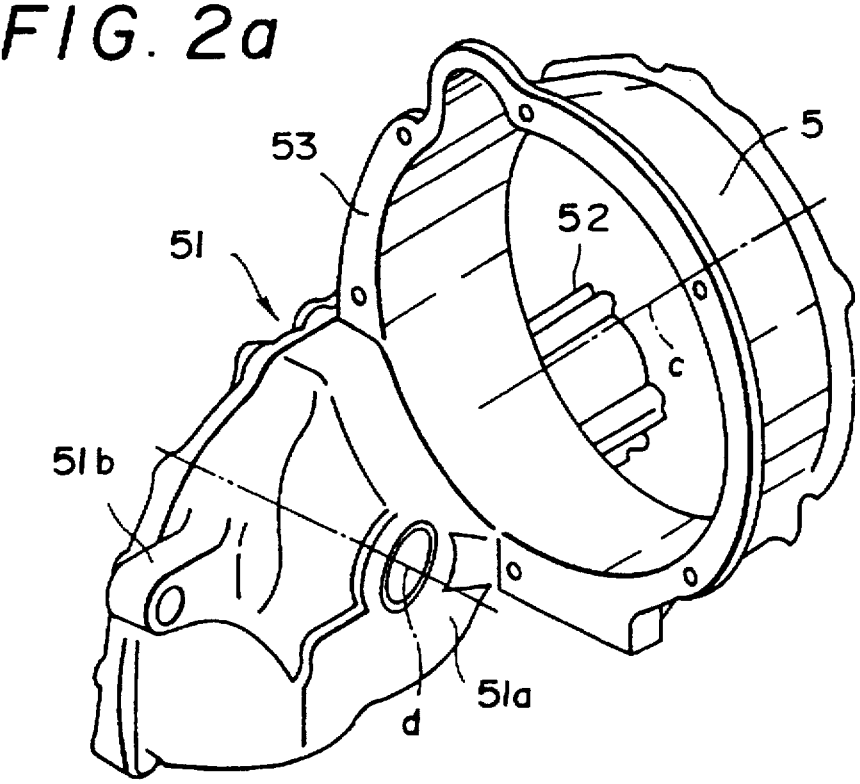
FIG. 2a is a perspective view of a front transmission case and a differential case integrally formed into a single unit viewed in the obliquely frontal direction.
Figure 2B:
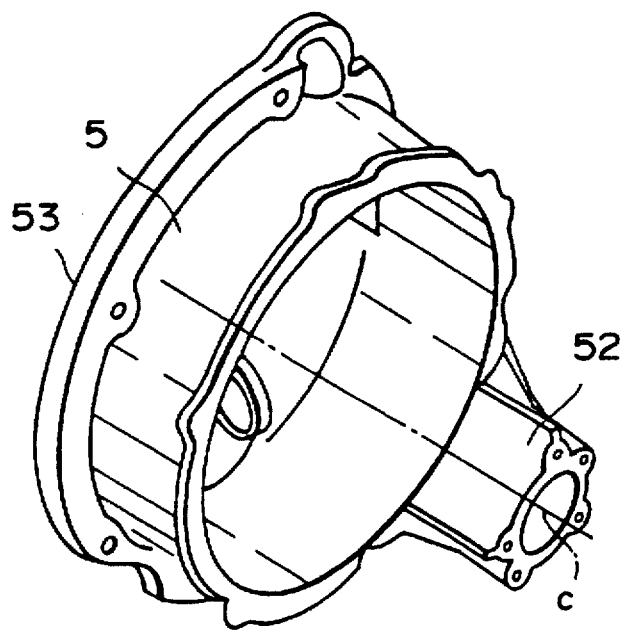
FIG. 2b is a perspective view of the unit shown in FIG. 2a viewed in the obliquely rear direction.

Further, numeral 4 denotes a transmission case which comprises a front case section 5 for accommodating a clutch or a torque converter, an intermediate case section 6 for accommodating a transmission gear set, and an extension section 7 for accommodating a transfer clutch. The front case section 5, the intermediate section 6 and the extension section 7 are fastened by fastening bolts with each other to form a single transmission case. The front case section 5 includes a differential housing 51 integrated into a single unit for accommodating a final reduction device (front differential), as illustrated in FIG. 2a and FIG. 2b, such that the differential housing 51 is protruded in the front direction from the right lower part of the front case section 5. Further, the front case section 5 includes a drive pinion holder 5 formed integrally therewith and protruded in the rear direction from the rear end thereof. At the front end of the front case section 5 there is provided a mating surface 53 for connecting the rear end of the engine 1 therewith. Since the differential housing 51 includes an inner housing 51a which is formed along and connected with the inner periphery surface of the front case section 5, the above mating surface 53 is broken at the root of the inner housing 51a on the right lower side of the front case section 5. Further, the inner housing 51a includes a differential center (an output shaft holder of the final reduction device). Further, at the front end of the inner housing 51a there is provided a jointing member 51b projected ahead thereof for jointing the differential housing 51 to the side surface of a lower case 8 depicted hereinafter.

Numeral 8 indicates a lower case which is a casting structure having a mating surface 81 mated with the lower flange 11 of the engine 1 at the upper end thereof, a mating surface 82 mated with an oil pan 9 at the Lower end thereof, and a mating surface 83 mated with the mating surface 53 of the front case section 5. The mating surface 83 is flush with the mating surface 13 of the rear end of the cylinder block and the mating surface 53 of the front case section 5. The lower case 8 is casted integrally with an output shaft holder 84 for bearing the output shaft extended outwardly on the left side of the final reduction device accommodated in the differential housing 51.

The lower case 8 is fastened by fastening bolts (not shown) on the mating surface 81 with the lower flange 11 of the engine 1, on the mating surface 82 with an oil pan 9 and on the mating surface 53 with the front case section 5 respectively. Further, the cylinder block is fastened by fastening bolts (not shown) on the mating surface 13 with the front case section 5. Further, the differential housing 51 formed integrally with the front case section 5 is connected at the jointing member 51b thereof with the lower case 8 by a fastening bolt 10 and a slide bush (not shown). The fastening bolt 10 with the slide bush acts as receiving the reaction force from the hypoid gear to prevent the differential housing 51 from being deformed. The axis of the fastening bolt is preferably in parallel with the output shaft of the differential gear. Thus, the engine 1 is jointed to the transmission case 4.

As described before, the mating surface 53 of the front case section 5 is broken at the root of the inner housing 51a of the differential housing 51. The purpose of providing this broken mating surface is to reduce the distance between the center a of the crankshaft and the center c of the drive pinion as much as possible. To avoid an interference with the inner housing 51a projected inward, a cutaway section 14 is provided at the mating surface 13 of the cylinder block and at the mating surface 83 of the lower case 8, as shown in FIG. 1b and FIG. 1c. When the front case section 5 is connected on the se mating surfaces with the cylinder block and the lower case, portions being in contact with the cut-away section 14 need some amount of gaps between the inner housing 51a and the cylinder block or between the inner housing 51a and the lower case 8. Preferably, the amount of the gaps should be as small as possible from the view point of the noise reduction.

Thus, the differential housing 51 is positioned in a space behind the cylinder block of the right bank in such a way that its rear end is integrally held by the transmission case 4 through the front case section 5 and its front end is mechanically jointed to the engine 1 through the lower case 8. The front half of the differential housing 51 gets under the cylinder block of the right bank.

A right output shaft of the final reduction device accommodated in the differential housing 51 extends therefrom toward the front right wheel. A left output shaft extending on the opposite side of the engine passes through in the lower case 4 and extends from the lower case 4 toward the front left wheel after being held by the output shaft holder 84 mounted in the lower case 8.

In the power unit thus constituted, torque and revolution of the crankshaft is transferred backward to the transmission gears in the intermediate case section 6 through the clutch or the torque converter in the front case section 5. After the engine revolution is changed by the transmission gears, the engine power is transmitted to the drive pinion being held by the drive pinion holder 52. The drive pinion extending forward to the final reduction device in the differential housing 51 drives the hypoid gear. The crown gear meshed with the hypoid gear drives the differential gear set to transmit torque and revolution to the left and right axles shaft through the left and right constant velocity joints respectively. As a result of this constitution of power unit, the position of the front axle shafts can be shifted substantially forward and this contributes to the reduction of the front overhang length of the vehicle.

In the embodiment according to the present invention, a horizontally opposed type engine has been cited as an exemplary power unit, however the engine applied to the aspect of the present invention may be other type of engine such as an in-line engine or a V-type engine.

In case of the in-line engine, the engine is mounted on the vehicle such that its crankshaft is arranged in the longitudinal direction of the vehicle and its cylinder axis is slanted to the left or right with respect to the vehicle longitudinal direction. The front differential case which is formed integrally with the front transmission case or the transmission case itself is supported by the lower case or the oil pan of the engine to receive the reaction force from the final reduction gear set.

In case of the V-type engine, the front differential case may be placed using the space obtained by of setting forward either of the left or right bank or using the space under the slanted cylinder block.

According to the pre sent invention, since the differential housing is arranged at the space behind the forwardly offset cylinder block and at the space under the cylinder block of the horizontally opposed engine or the V-type engine, the output shaft of the final reduction gear can be located ahead of the mating surface between the transmission case and the rear end of the engine, whereby the front overhang length of the vehicle can be reduced. Further, according to the present invention, since the distance between the crankshaft center and the drive pinion center is reduced, the more compact power unit can be realized. Further, since the differential housing is integrally casted with the front case section of the transmission case, the centering precision of the drive pinion shaft with respect to the crankshaft center and the assembling precision of the drive pinion can be substantially improved. Also, since this differential housing is bolt-tightened at the front end thereof by the lower case of the engine, the reaction force of the hypoid gear in the differential housing can be stably supported, thereby enabling deformation of the differential housing to be prevented.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A power unit, comprising:

an engine having a first bank and a second bank;

a transmission;

a transmission case for receiving said transmission, said transmission case having a mating surface connected with said engine; and a differential housing having a first portion and a second portion, said first portion being supported by said engine and said second portion being supported by said transmission case, said differential housing having an inner housing portion disposed between said first bank and said mating surface of said transmission case.

2. The power unit defined by claim 1, wherein:

said engine includes a lower case, said first portion of said differential housing is supported by said lower case, and said second portion of said differential housing is integrally formed with said transmission case.

3. The power unit defined by claim 1, wherein:

said first portion of said differential housing comprises a jointing member, said jointing member being bolted to a side portion of said lower case of said engine.

4. The power unit defined by claim 1, wherein:

said matting surface of said transmission case defines a broken portion, and at least a portion of said differential housing is received at said broken portion.

5. The power unit defined by claim 1, wherein:

said engine includes a lower case, said engine and said lower case each including a mating surface, said mating surfaces of said engine and said lower case being positioned in proximity and parallel to said mating surface of said transmission, and said mating surfaces of said engine and said lower case each defining a cut-away section for receiving a portion of said differential housing.

6. The power unit defined by claim 1, wherein:

said engine is a horizontally opposed engine.

7. The power unit defined by claim 1, wherein:

said engine is a V-type engine.

8. The power unit defined by claim 1, wherein:

said transmission case comprises a front case section for a clutch or a torque convertor, a intermediate case section for transmission gearing and an extension section for a transfer clutch, said differential housing being integrally formed with said front case section.

9. The power unit defined by claim 1, wherein:

said first bank is offset from said second bank in a direction away from said transmission.

10. The power unit defined by claim 9, wherein:

said transmission case comprises a front case section for a clutch or a torque convertor, a intermediate case section for transmission gearing and an extension section for a transfer clutch, said differential housing being integrally formed with said front case section.

11. The power unit defined by claim 9, wherein:

said second portion of said differential housing is fixed with said transmission case.

12. The power unit defined by claim 11, wherein:

said second portion of said differential housing is integral with said transmission case.

13. The power unit defined by claim 12, wherein:

said engine includes a lower case, and said first portion of said differential housing is supported by said lower case of said engine.

14. The power unit defined by claim 13, wherein:

said first portion of said differential housing comprises a jointing member, said jointing member being coupled with said lower case of said engine.

15. The power unit defined by claim 14, wherein:

said jointing member of said differential housing is bolted to a side portion of said lower case of said engine.

16. The power unit defined by claim 15, wherein:

said mating surface of said transmission case defines a broken portion, and at least a portion of said differential housing is received at said broken portion.

17. The power unit defined by claim 16, wherein:

said engine includes a mating surface and said lower case includes a mating surface, said mating surfaces of said engine and said lower case each being positioned in proximity and parallel to said mating surface of said transmission, and said mating surfaces of said engine and said lower case each defining a cut-away section for receiving a portion of said differential housing.

18. The power unit defined by claim 17, wherein:

said engine is a horizontally opposed engine.

19. The power unit defined by claim 18, wherein:

said engine is a V-type engine.

20. A differential housing, comprising:

a main body defining a drive pinion opening and an axle shaft opening;

a front member supported by the main body for jointing to an engine casing; and a connecting portion supported by said main body and having an opening defined therethrough, said connecting portion defining a connecting surface for connecting said connecting portion with an engine casing, said connecting surface defining an engine side and a connecting portion side, said connecting portion being disposed on said connecting portion side of said connecting surface and said axle shaft opening of said main body being disposed on said engine side of said connecting surface.

21. The differential housing defined by claim 20, wherein:

a longitudinal axis of said axle shaft opening of said main body and said longitudinal axis of said opening of said connecting portion are substantially parallel.

22. The differential housing defined by claim 21, wherein:

said connecting portion includes a mating surface, said mating surface being connected with said connecting surface of said engine and a broken portion defined thereby, said main body being at least partly disposed at said broken portion.

* * * * *